(12) United States Patent
Chen

(10) Patent No.: US 9,082,210 B2
(45) Date of Patent: Jul. 14, 2015

(54) METHOD AND APPARATUS FOR ADJUSTING IMAGE DEPTH

(71) Applicant: ALi (Zhuhai) Corporation, Zhuhai, Guangdong (CN)

(72) Inventor: Yue-Yong Chen, Gunagdong (CN)

(73) Assignee: ALi (Zhuhai) Corporation, Tangjia, Zhuhai, Guangdong (CN)

( * ) Notice: Subject to any disclaimer, the term of this patent is extended or adjusted under 35 U.S.C. 154(b) by 263 days.

(21) Appl. No.: 13/802,859

(22) Filed: Mar. 14, 2013

(65) Prior Publication Data

US 2014/0079313 A1   Mar. 20, 2014

(30) Foreign Application Priority Data

Sep. 19, 2012   (CN) .......................... 2012 1 0353209

(51) Int. Cl.
*G06T 15/00* (2011.01)
*H04N 13/00* (2006.01)

(52) U.S. Cl.
CPC ............ *G06T 15/00* (2013.01); *H04N 13/0022* (2013.01); *H04N 2013/0081* (2013.01)

(58) Field of Classification Search
None
See application file for complete search history.

(56) References Cited

U.S. PATENT DOCUMENTS

2007/0047040 A1   3/2007   Ha
2008/0240549 A1*  10/2008  Koo et al. ..................... 382/154
2012/0069159 A1*  3/2012   Matsui et al. .................. 348/51
2012/0306866 A1*  12/2012  Kwon et al. ................... 345/419
2013/0147928 A1*  6/2013   Woo et al. ...................... 348/51

FOREIGN PATENT DOCUMENTS

CN   102427542 A   4/2012
CN   102474644 A   5/2012

OTHER PUBLICATIONS

Dong et el. "Improvement of Virtual View Rendering Based on Depth Image." Sixth International Conference on Image and Graphics, Aug. 12, 2011, pp. 254-257.*
Ze-Nian Li, Member, IEEE, and Gongzhu Hu, Member, IEEE, "Analysis of Disparity Gradient Based Cooperative Stereo", IEEE Transactions on Image Processing, vol. 5, No. 11, pp. 1493-1506, 1996 IEEE, Nov. 30, 1996.
Ge Liang, Zhu Qing-sheng, Fu Si-si, "Disparity Estimation Algorithm Based on Texture Analysis", China Academic Journal Electronic Publishing House, Computer Engineering, vol.35, No. 20, Oct. 20, 2009, pp. 7-9. Abstract.
Chen Wen-xin, Chen Wei-dong, Zhu Zhong-jie, Bai Yong-qiang, "Novel scheme for disparity estimation based on variable feature primitive", Computer Engineering and Applications, 2008, 44(15), pp. 58-60, May 21, 2008.

* cited by examiner

*Primary Examiner* — Jon Chang
(74) *Attorney, Agent, or Firm* — Winston Hsu; Scott Margo

(57) ABSTRACT

A method for adjusting image depth includes receiving a three-dimension (3D) image including a first image and a second image. The method includes measuring the 3D image to generate a first parallax gradient value, calculating a second parallax gradient value according to the first parallax gradient value and a user setting value, calculating a parallax modification value, and moving the first image according to the corresponding parallax modification value so as to generate a adjusted first image for replacing the first image.

20 Claims, 5 Drawing Sheets

METHOD AND APPARATUS FOR ADJUSTING IMAGE DEPTH

BACKGROUND OF THE INVENTION

1. Field of the Invention

The present invention relates to a method and apparatus for adjusting image depth, and more particularly, to a method and apparatus for adjusting image depth based on image parallax gradient.

2. Description of the Prior Art

With the progression of multimedia technology, users are pursuing stereo/three-dimensional (3D) and realistic image displays. In the present flat panel displays, the ordinary two-dimensional (2D) display method already can not fulfill the demand of pursuing vivid visual experience of users. Since the most vivid visual effect is stereoscopic vision acquired by binocular disparity of human eyes, how to provide different images to each eye via 3D image display such that observers get visual experience with depth becomes one of development focuses at present.

Since objects located at different positions may have various depths, an observer will perceive layering (or called gradation) of 3D effect accordingly. The 3D image display provides separate images to left eye and right eye while an observer utilizing eyes for observing objects wherein left eye and right eye has different vision angles, such that the brain of the observer analyses and superimposes the seen images and senses layering and depth of the objects, so as to perceive a 3D image. In other words, 3D display devices respectively display left-eye image and right-eye image to left eye and right eye of the observer, such that the observer experiences images with 3D effect. Parallax is a difference in the apparent position of an object viewed along two different lines of sight and here parallax is used to represent the difference in position of an object in a 3D image pair measured in pixels. Disparity is the difference in image location of an object seen by the left and right eyes and here disparity is used to represent the difference in position of an object in a 3D image pair seen by the left and right eyes measured in millimeter units (mm).

The same 3D image displayed on different size of display devices will introduce different experienced 3D effects. For example, the larger display screen uses, the larger disparity occurs, and thus, the 3D effect may be too strong. Since a small parallax may result in a large disparity due to the large movie theater screen, a film shooter usually uses a rather small parallax during film shooting, so as to avoid the audience feeling sick and dizzy. However, when the film is displayed on a typical television, the small parallax may result in a weak 3D effect. On the other hand, during television program shooting, a cameraman usually uses simple shooting equipments having a small monitor screen. Thus, the cameraman requires using rather large parallax to obtain a large disparity for making the 3D effect clearly visible on the small monitor screen. However, when the television program with a stronger 3D effect is displayed on a large television, the 3D effect will be too strong. In short, when the depth of 3D image is too strong or too weak during film shooting or television program shooting, or when an observer wants to watch the 3D image in different size of displays, this may result in an uncomfortable view or a weak 3D effect.

The conventional technique usually calculates disparity values according to the maximum value, the minimum value, and the mean value of the parallax values of the 3D image and display size. Furthermore, the calculated disparity value is compared with a predetermined maximum threshold value, predetermined minimum threshold value and predetermined mean threshold value for determining direction of adjustment. Accordingly, the whole left-eye image or the whole right-eye image is shifted together to change depth of the whole 3D image. However, shifting of the whole 3D image cannot change the relative distances among objects in the 3D image, and thus is unable to increase layering of 3D effect. Besides, while calculating image parallax, the image may be divided into multiple blocks and blocks of one frame are compared with blocks of another frame, such that a block matching may be completed to obtain corresponding match blocks on another frame. The distances between blocks on one frame and corresponding match blocks on another frame are regards as the image parallax. However, such a block matching method would incur longer search time and more complex computations, and are thus not suited for real-time applications.

SUMMARY OF THE INVENTION

Therefore, the primary objective of the invention is to provide a method and apparatus for adjusting image depth.

An embodiment of the invention discloses a method for adjusting image depth, comprising receiving a three-dimension (3D) image, wherein the 3D image comprises a first image and a second image; measuring the 3D image to generate a first parallax gradient value; calculating a second parallax gradient value according to the first parallax gradient value and a user setting value; calculating a parallax modification value according to the second parallax gradient value; and moving the first image according to the corresponding parallax modification value so as to generate an adjusted first image for replacing the first image.

An embodiment of the invention further discloses an image depth adjustment apparatus comprising a receiving unit for receiving a three-dimension (3D) image, wherein the 3D image comprises a first image and a second image; a first parallax gradient generating unit for measuring the 3D image to generate a first parallax gradient value; a second parallax gradient generating unit for calculating a second parallax gradient value according to the first parallax gradient value and a user setting value; a modification value generating unit for calculating a parallax modification value according to the second parallax gradient value; and an adjusting unit for moving the first image according to the corresponding parallax modification value so as to generate an adjusted first image for replacing the first image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
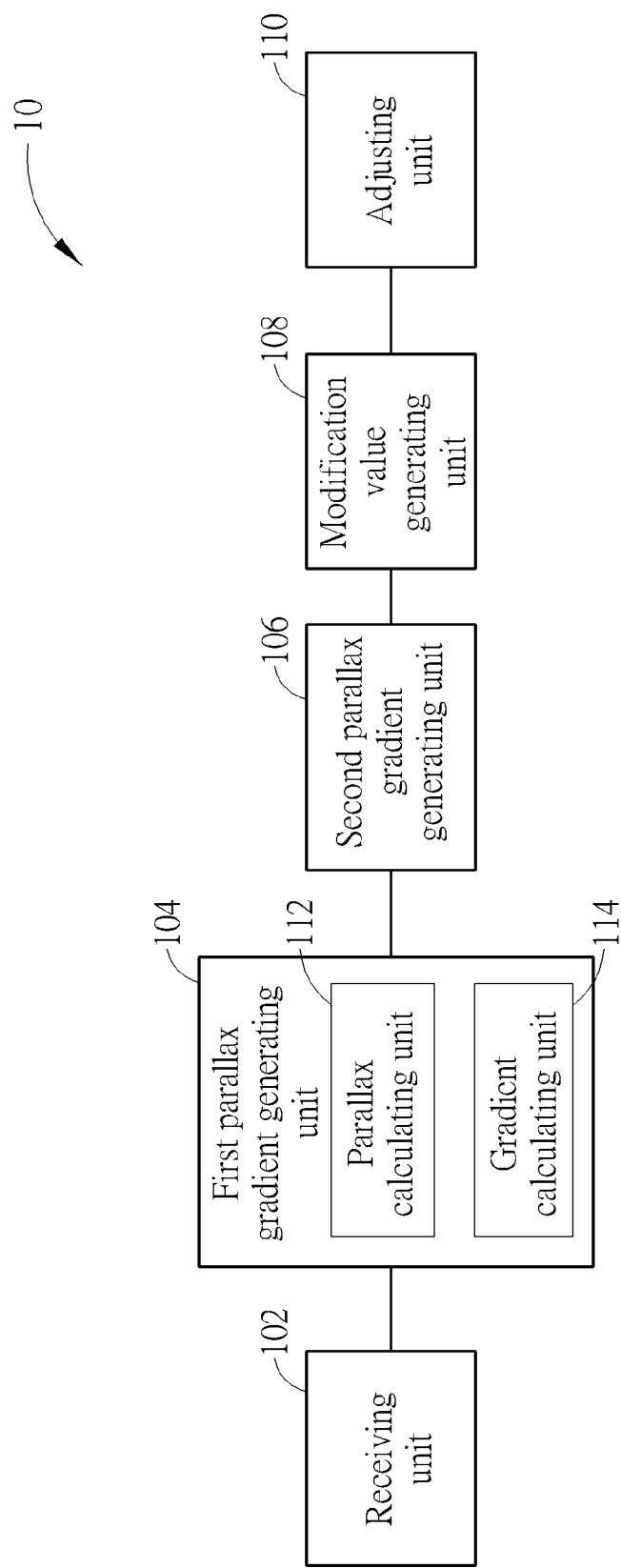
FIG. 1 is a schematic diagram of an image depth adjustment apparatus according to an exemplary embodiment of the present invention.

Please refer to FIG. 1, which is a schematic diagram of an image depth adjustment apparatus 10 according to an exemplary embodiment of the present invention. As shown in FIG. 1, the image depth adjustment apparatus 10 includes a receiving unit 102, a first parallax gradient generating unit 104, a second parallax gradient generating unit 106, a modification value generating unit 108 and an adjusting unit 110. The receiving unit 102 is utilized for receiving a three-dimension (3D) image IMG. The 3D image IMG includes a left-eye image IMG_L and a right-eye image IMG_R. The first parallax gradient generating unit 104 is utilized for measuring the 3D image IMG to generate a first parallax gradient value G. The first parallax gradient generating unit 104 includes a parallax calculating unit 112 and a gradient calculating unit 114. The parallax calculating unit 112 is utilized for measuring the left-eye image IMG_L and the right-eye image IMG_R of the 3D image IMG and calculating parallax values of pixels in the 3D image IMG. The gradient calculating unit 114 is utilized for calculating first parallax gradient value G according to the parallax values of all pixels or part of pixels in the 3D image IMG. The second parallax gradient generating unit 106 is utilized for calculating a second parallax gradient value G' according to the first parallax gradient value G and a user setting value SV. The modification value generating unit 108 is utilized for calculating a parallax modification value C of each pixel in the 3D image IMG according to the second parallax gradient value G'. The adjusting unit 110 is utilized for moving pixels of the left-eye image IMG_L (or the right-eye image IMG_R) according to the corresponding parallax modification values, so as to generate an adjusted left-eye image IMG_L' (or an adjusted right-eye image IMG_R') for replacing the left-eye image IMG_L (or replacing the right-eye image IMG_R).

In brief, the image depth adjustment apparatus 10 is capable of moving each pixel of the 3D image IMG for adjusting the depth according to the corresponding parallax modification values such that the relative distances among objects in the 3D image will be changed. As a result, when the adjusted left-eye image IMG_L' and the right-eye image IMG_R (or the left-eye image IMG_L and the adjusted right-eye image IMG_R') are displayed on the 3D display, the observer can obviously perceive the increasing or reducing 3D effect. Therefore, while utilizing different size of displays to view the 3D image IMG, the user can adjust the layer of 3D effect via the image depth adjustment apparatus 10 according to different requirements, and thus enhancing convenience and providing a comfortable view for the observer.

Figure 2:
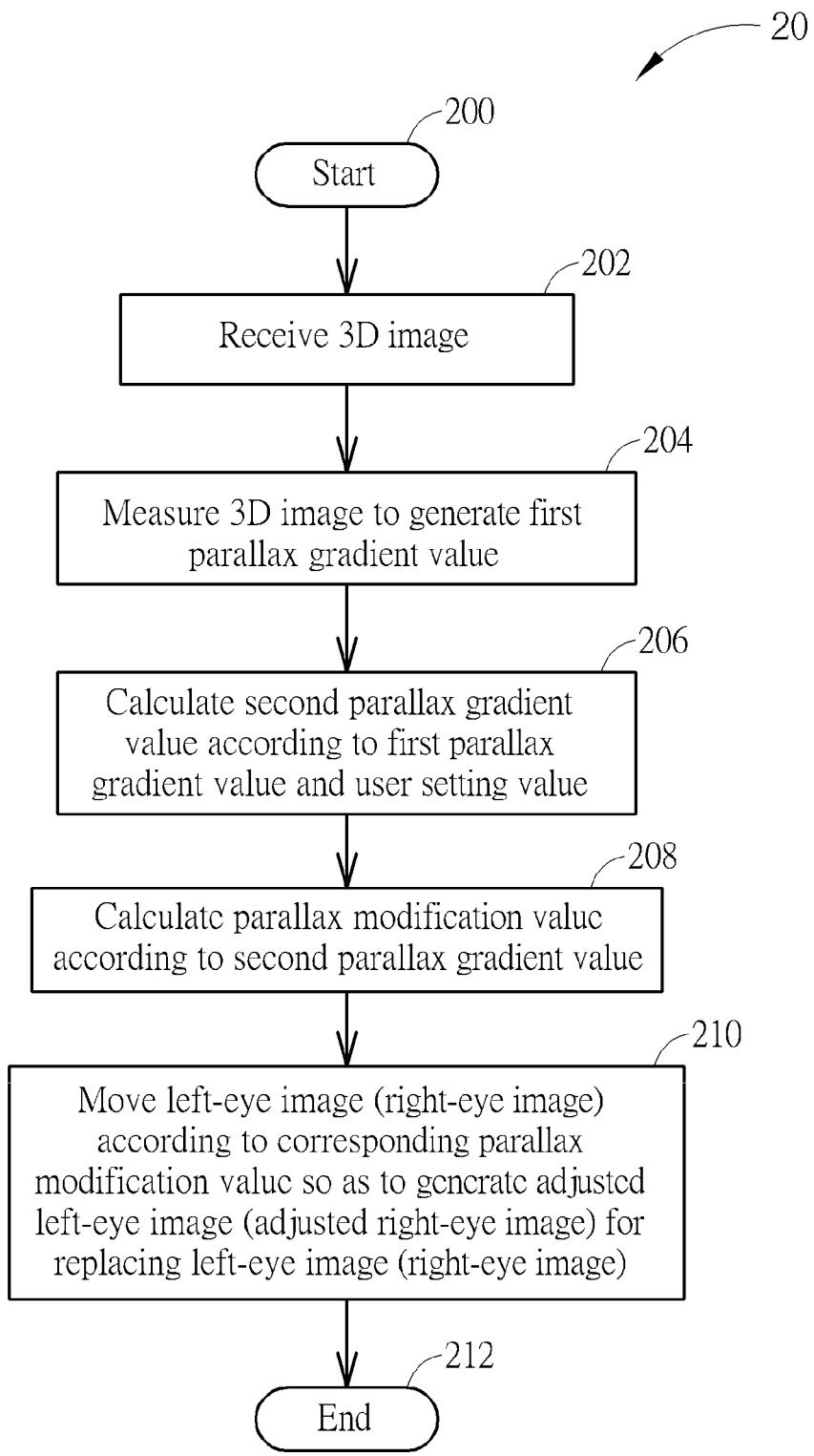
FIG. 2 is a schematic diagram of a procedure according to an exemplary embodiment of the present invention.

As to the implementation of the image depth adjustment apparatus 10, please refer to FIG. 2. FIG. 2 is a schematic diagram of a procedure 20 according to an exemplary embodiment of the present invention. Please note that if a roughly identical result can be obtained, the steps shown in FIG. 2 are not limited to be performed according to the order shown in FIG. 2. The procedure 20 comprises the following steps:

Step 200: Start.
Step 202: Receive 3D image.
Step 204: Measure 3D image to generate first parallax gradient value.
Step 206: Calculate second parallax gradient value according to first parallax gradient value and user setting value.
Step 208: Calculate parallax modification value according to second parallax gradient value.
Step 210: Move left-eye image (right-eye image) according to corresponding parallax modification value so as to generate adjusted left-eye image (adjusted right-eye image) for replacing left-eye image (right-eye image).
Step 212: End.

Detailed description of the steps of the procedure 20 is as follows. In Step 202, the receiving unit 102 receives a 3D image IMG including a left-eye image IMG_L and a right-eye image IMG_R. In Step 204, the first parallax gradient generating unit 104 measures the 3D image IMG and accordingly generates the first parallax gradient value G. For example, the first parallax gradient generating unit 104 calculates parallax values of pixels in the 3D image IMG and calculates the first parallax gradient value G according to the parallax values of all pixels or part of pixels in the 3D image IMG. In detail, the parallax calculating unit 112 of the first parallax gradient generating unit 104 can measure the left-eye image IMG_L and the right-eye image IMG_R and calculate the parallax values of pixels in the 3D image IMG. After that, the gradient calculating unit 114 can calculate the first parallax gradient value G according to the parallax values of all pixels or part of pixels in the 3D image IMG.

Moreover, the gradient of parallax values in a 3D image may vary in response to various scenes. For example, in some scene, objects located at the bottom-half of an image are closer to the observer and objects located at the upper-half of the image are farther away from the observer. Or, objects located at the left-half of an image are closer to the observer and objects located at the right-half of the image are farther away from the observer. As a result, in this exemplary embodiment, the first parallax gradient value G can include one or multiple gradient values. For example, the first parallax gradient value G includes, but is not limited to, a first horizontal parallax gradient value Gh and a first vertical parallax gradient value Gv. In such a situation, the gradient calculating unit 114 can calculate an average AV1 of the parallax values of the right-half of the 3D image IMG. That is, the average AV1 represents an average value of the parallax values of pixels located at the right-half of the 3D image IMG. Similarly, the gradient calculating unit 114 can calculate an average AV2 of the parallax values of the left-half of the 3D image IMG. After that, a first horizontal parallax gradient value Gh can be obtained by calculating a difference between the average AV1 and the average AV2, i.e. the first horizontal parallax gradient value Gh is equal to a difference between the average AV1 and the average AV2. Similarly, the gradient calculating unit 114 can calculate an average AV3 of the parallax values of the bottom-half of the 3D image IMG. The average AV3 represents an average value of the parallax values of pixels located at the bottom-half of the 3D image IMG. In a similar manner, the gradient calculating unit 114 can calculate an average AV4 of the parallax values of the upper-half of the 3D image IMG. As such, a first vertical parallax gradient value Gv can be obtained by calculating a difference between the average AV3 and the average AV4, i.e. the first vertical parallax gradient value Gv is equal to a difference between the average AV3 and the average AV4. In other words, the gradient calculating unit 114 is capable of calculating the first parallax gradient value G via the parallax values of pixels in the 3D image IMG. Besides, it is not limited to calculate the first parallax gradient value G by using all pixels of the 3D image IMG. The first parallax gradient value G can also be calculated by using the parallax values of part of pixels in the 3D image IMG.

Figure 3:
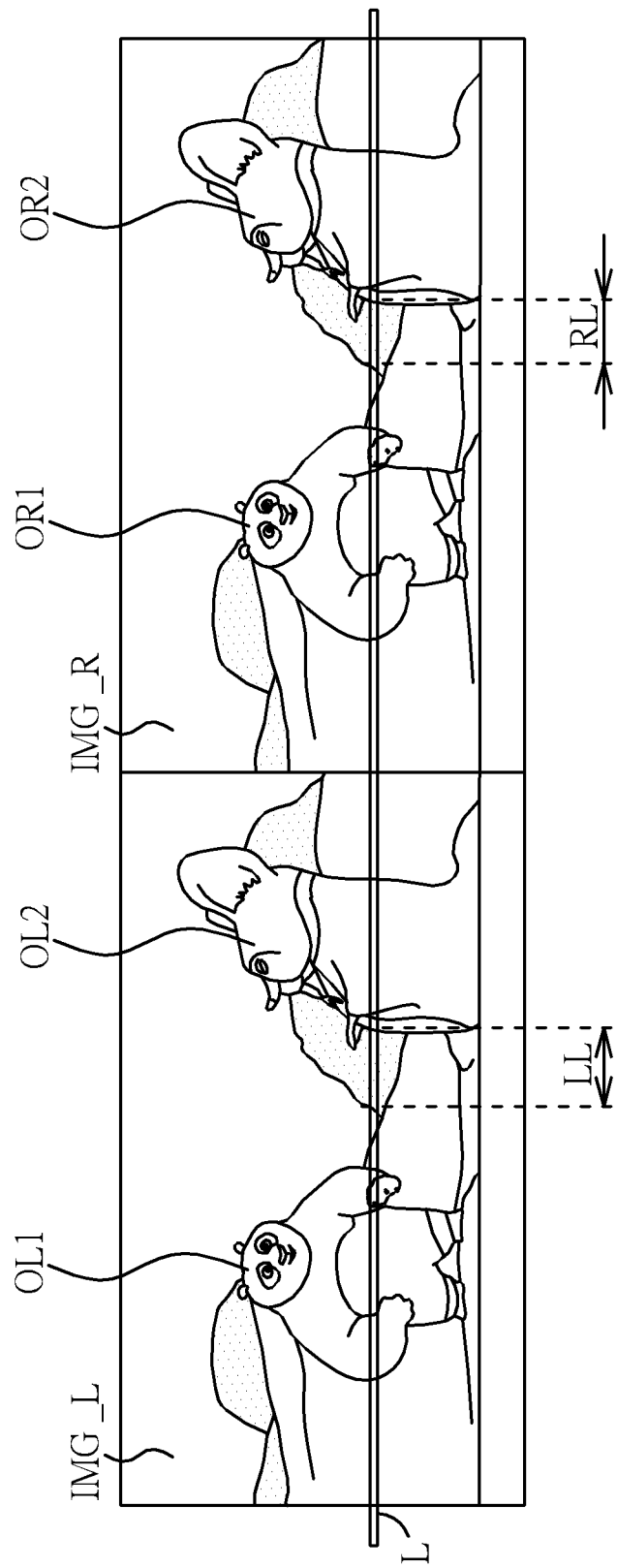
FIG. 3 is a schematic diagram of the depth adjustment of a 3D image according to an exemplary embodiment of the present invention.

Please refer to FIG. 3, which is a schematic diagram of the depth adjustment of a 3D image IMG according to an exemplary embodiment of the present invention. As shown in FIG. 3, the 3D image IMG includes a left-eye image IMG_L and a right-eye image IMG_R. An object located at left side of the 3D image IMG (i.e. object OL1 in the left-eye image IMG_L and object OR1 in the right-eye image IMG_R) is farther away from the observer. An object located at right side of the 3D image IMG (i.e. object OL2 in the left-eye image IMG_L and object OR2 in the right-eye image IMG_R) is closer to the observer. This means, there exists a negative horizontal parallax gradient value from left to right along the horizontal direction. When the 3D image IMG is divided into a left-half portion and a right-half portion, the left-half of the left-eye image IMG_L includes the object OL1 and the right-half of the left-eye image IMG_L includes the object OL2. Regarding the left-half of the left-eye image IMG_L, the ground under the object OL1, the object OL1 and the mountain behind the object OL1 are progressively further away from the observer. This means, there exists a positive vertical parallax gradient value from bottom to up along the vertical direction. Regarding the right-half of the left-eye image IMG_L, the object OL2 almost occupy the full right-half of the left-eye image IMG_L, and thus the vertical parallax gradient value may be approach zero. If only one vertical parallax gradient value (from bottom to up) is calculated for the 3D image IMG, the calculated vertical parallax gradient value may be equal to an average of the vertical parallax gradient values of left-half and the right-half of the 3D image IMG.

In another exemplary embodiment, the abovementioned first horizontal parallax gradient value Gh and first vertical parallax gradient value Gv can also be calculated in the following manner. For the first horizontal parallax gradient value Gh, the gradient calculating unit 114 can divide the 3D image IMG into a plurality of blocks along the horizontal direction. The gradient calculating unit 114 further calculates an average of the parallax values of each block. That is, an average of the parallax values of all pixels of each block is calculated. After that, the gradient calculating unit 114 respectively calculates a difference of parallax between each adjacent blocks, so as to generate a plurality of first candidate horizontal parallax gradient values. For example, if the 3D image IMG is divided into three blocks along the horizontal direction, there will have two first candidate horizontal parallax gradient values. If the 3D image IMG is divided into five blocks along horizontal direction, there will have four first candidate horizontal parallax gradient values. Furthermore, the gradient calculating unit 114 calculates an average or a median of all first candidate horizontal parallax gradient values, and the average calculation result is taken as the first horizontal parallax gradient value Gh of the 3D image IMG. Similarly, for the first vertical parallax gradient value Gv, the gradient calculating unit 114 can divide the 3D image IMG into a plurality of blocks along the vertical direction and respectively calculate a difference of parallax between each adjacent blocks, so as to generate a plurality of first candidate vertical parallax gradient values. Accordingly, the gradient calculating unit 114 calculates an average or a median of all first candidate vertical parallax gradient values, and the average calculation result is taken as the first vertical parallax gradient value Gv of the 3D image IMG.

In addition, after the plurality of first candidate horizontal (vertical) parallax gradient values are calculated, the gradient calculating unit 114 can further perform a filtering process on the calculated first candidate horizontal (vertical) parallax gradient values. Then, the gradient calculating unit 114 calculates an average of the filtered first candidate horizontal (vertical) parallax gradient values, and the average calculation result is taken as the first horizontal (vertical) parallax gradient value Gh (Gv) of the 3D image IMG accordingly. Alternatively, for more accuracy, after the plurality of first candidate horizontal (vertical) parallax gradient values is calculated, the first candidate horizontal (vertical) parallax gradient values with the largest absolute value or the smallest absolute value may be discarded. The gradient calculating unit 114 further calculate an average of the remaining first candidate horizontal (vertical) parallax gradient values, and the average calculation result is taken as the first horizontal (vertical) parallax gradient value Gh (Gv) of the 3D image IMG, thus providing more accurately calculation.

Furthermore, after the first parallax gradient value G is calculated in Step 204, the second parallax gradient generating unit 106 calculates a second parallax gradient value G' according to the first parallax gradient value G and a user setting value SV (Step 206). For example, a product of the first parallax gradient value G and the user setting value SV can be calculated by the second parallax gradient generating unit 106 so as to obtain the second parallax gradient value G'. The second parallax gradient value G' can be represented by Eq. 1:

$$G' = G \times SV \quad (1)$$

where the positive and negative of the user setting value SV is related to the trend of parallax adjustment. For example, if the user setting value SV is a positive value, it represents enhancing layering of 3D effect; if the user setting value SV is a negative value, it represents reducing layering of 3D effect. Moreover, absolute value of the user setting value SV is related to the magnitude of parallax adjustment. When the positive and negative of the first parallax gradient value G is identical to the second parallax gradient value G', the first parallax gradient value G and the second parallax gradient value G' are positive values or are negative values, this means enhancing the layering of 3D effect. In such a situation, when the adjusted left-eye image IMG_L' and the right-eye image IMG_R (or the left-eye image IMG_L and the adjusted right-eye image IMG_R') are outputted to a 3D display device and displayed on the 3D display device, the observer will feel visual effect of the enhanced layering of 3D effect. Otherwise, when the positive and negative of the first parallax gradient value G is not identical to the second parallax gradient value G', this means reducing the layering of 3D effect. Thus, the observers will feel visual effect of the reduced layering of 3D effect. Besides, if the positive and negative of the first parallax gradient value G is not identical to the second parallax gradient value G' and the magnitude of the second parallax gradient value G' is larger than the magnitude of the first parallax gradient value G, the observers will feel reversed visual effect of layering of 3D effect.

Similarly, if the first parallax gradient value G includes a first horizontal parallax gradient value Gh and a first vertical parallax gradient value Gv, and a second parallax gradient value G' includes a second horizontal parallax gradient value Gh' and a second vertical parallax gradient value Gv'. The second horizontal parallax gradient value Gh' and the second vertical parallax gradient value Gv' can be represented by Eq. 2:

$$Gh' = Gh \times SV_h$$

$$Gv' = Gv \times SV_v \quad (2)$$

Furthermore, in Step 208, the modification value generating unit 108 calculates the parallax modification value C of each pixel of 3D image IMG according to the second parallax gradient G'. The parallax modification value C represents a moving distance of the corresponding pixel. For example, if the first parallax gradient value G includes the first horizontal parallax gradient value Gh and the first vertical parallax gradient value Gv. Meanwhile, the second horizontal parallax gradient value Gh' and the second vertical parallax gradient value Gv' are calculated by the second parallax gradient generating unit 106 in step 206. Therefore, for each corresponding pixel, the modification value generating unit 108 calculates a horizontal difference between a horizontal coordinate value of the corresponding pixel and a coordinate value of horizontal zero-point, and calculates a product of the calculated horizontal difference and the second horizontal parallax gradient value Gh' to obtain a horizontal parallax modification value Ch of the corresponding pixel. In the same manner, the modification value generating unit 108 calculates a vertical difference between a vertical coordinate value of the corresponding pixel and a coordinate value of vertical zero-point, and calculates a product of the vertical difference and the second vertical parallax gradient value Gv' to obtain a vertical parallax modification value Cv of the corresponding pixel. The parallax modification value C of the corresponding pixel is a sum of the horizontal parallax modification value Ch and the vertical parallax modification value Cv. Thus, for each pixel in the 3D image IMG, the parallax modification value C, the horizontal parallax modification value Ch and the vertical parallax modification value Cv can be represented by Eq. 3:

$$Ch=(x_1-x_0) \times Gh'$$

$$Cv=(y_1-y_0) \times Gv'$$

$$C=Ch+Cv \qquad (3)$$

where (x1, y1) represents a coordinate value of the corresponding pixel, (x0, y0) represents a coordinate value of the zero-point. Note that, a horizontal zero-point can be a center in horizontal direction, and a vertical zero-point can be a center in vertical direction. The horizontal zero-point and the vertical zero-point can be also adjusted according to settings of into the screen effect or out the screen effect. For example, a center coordinate is set and the image after gradient adjusting can be shifted according to the settings of into the screen effect or out the screen effect.

In step 210, the adjusting unit 110 adjusts the left-eye image IMG_L or the right-eye image IMG_R of the 3D image IMG according to the corresponding parallax modification value C of each pixel, so as to generate an adjusted left-eye image IMG_L' or an adjusted right-eye image IMG_R'. Taking adjustment of the left-eye image IMG_L for example, the adjusting unit 100 can adjust the pixel position of the left-eye image IMG_L according to the corresponding parallax modification value C of each pixel. Suppose the horizontal coordinates proceeds with positive numbers to the right and negatives to the left of the zero point. For example, when the horizontal parallax modification value Ch of a pixel P is a positive value of +2 (pixels) and the vertical parallax modification value Cv of the pixel P is a negative value of −1 (pixel), the corresponding parallax modification value C is equal to +1 (pixel). The pixel P is moved one pixel to the right by the adjusting unit 110. Such like this, the adjusting unit 110 moves each pixel of the left-eye image IMG_L according to its corresponding parallax modification value, so as to generate the adjusted left-eye image IMG_L'. As such, the adjusted left-eye image IMG_L' is utilized for replacing the original left-eye image IMG_L as left-eye image of the adjusted 3D image IMG'. This means, the adjusted 3D image IMG' includes the adjusted left-eye image IMG_L' and the right-eye image IMG_R. As a result, the adjusted left-eye image IMG_L' and the right-eye image IMG_R can be displayed on the 3D display device. Since the left-eye of the observer sees the adjusted left-eye image IMG_L' and the right-eye of the observer sees the right-eye image IMG_R, the observer will experience the adjusted 3D effect. Similarly, Taking adjustment of the right-eye image IMG_R for example, the adjusting unit 100 can adjust the pixel position of the right-eye image IMG_R according to the corresponding parallax modification value C of each pixel, so as to generate an adjusted right-eye image IMG_R'. In such a case, the adjusted 3D image IMG' includes the left-eye image IMG_L and the adjusted right-eye image IMG_R'. In addition, if the modification value C has a non-integer part, the non-integer part can be realized with the interpolation of surrounding pixel.

In brief, after the parallax modification value C corresponding to each pixel is calculated via Steps 202 to 208, the adjusting unit 110 moves pixels of the left-eye image IMG_L (or the right-eye image IMG_R) according to the corresponding parallax modification values, so as to generate an adjusted left-eye image IMG_L' (or an adjusted right-eye image IMG_R'). The adjusted 3D image IMG' can be created by overlaying the adjusted left-eye image IMG_L' (or the adjusted right-eye image IMG_R') with the unadjusted right-eye image IMG_R (or the unadjusted left-eye image IMG_L), thus achieving the depth adjustment purpose.

Figure 4:
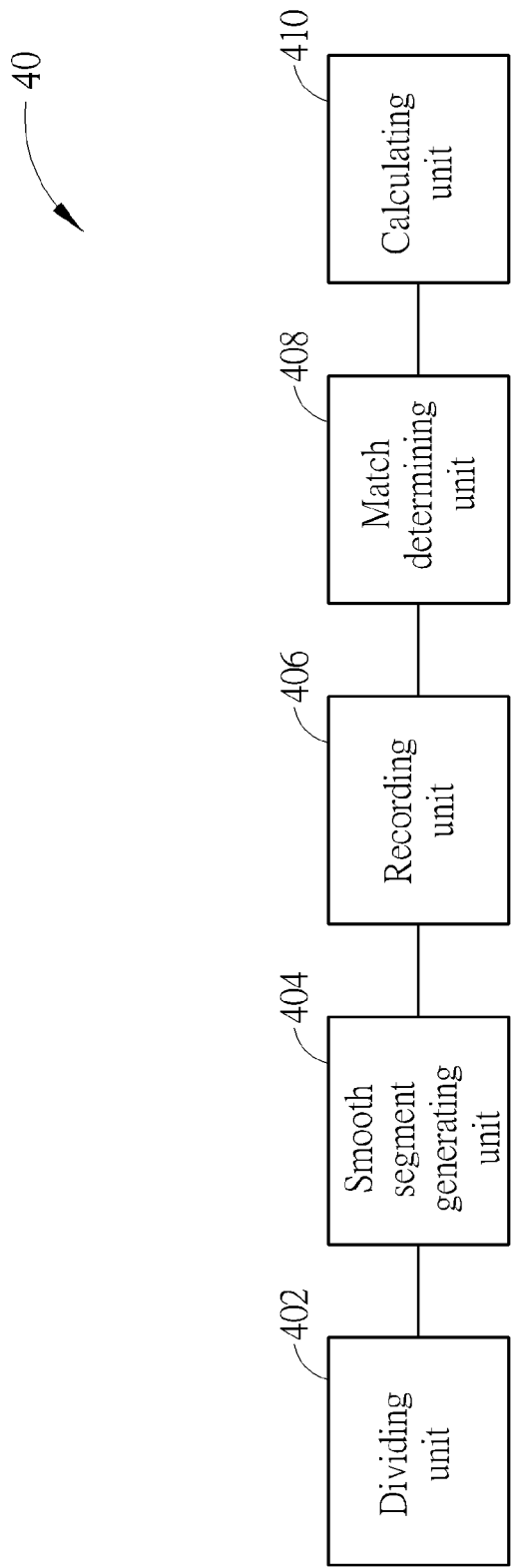
FIG. 4 is a schematic diagram of an alternative design of the parallax calculating unit shown in FIG. 1 according to an exemplary embodiment of the present invention.
Figure 5:
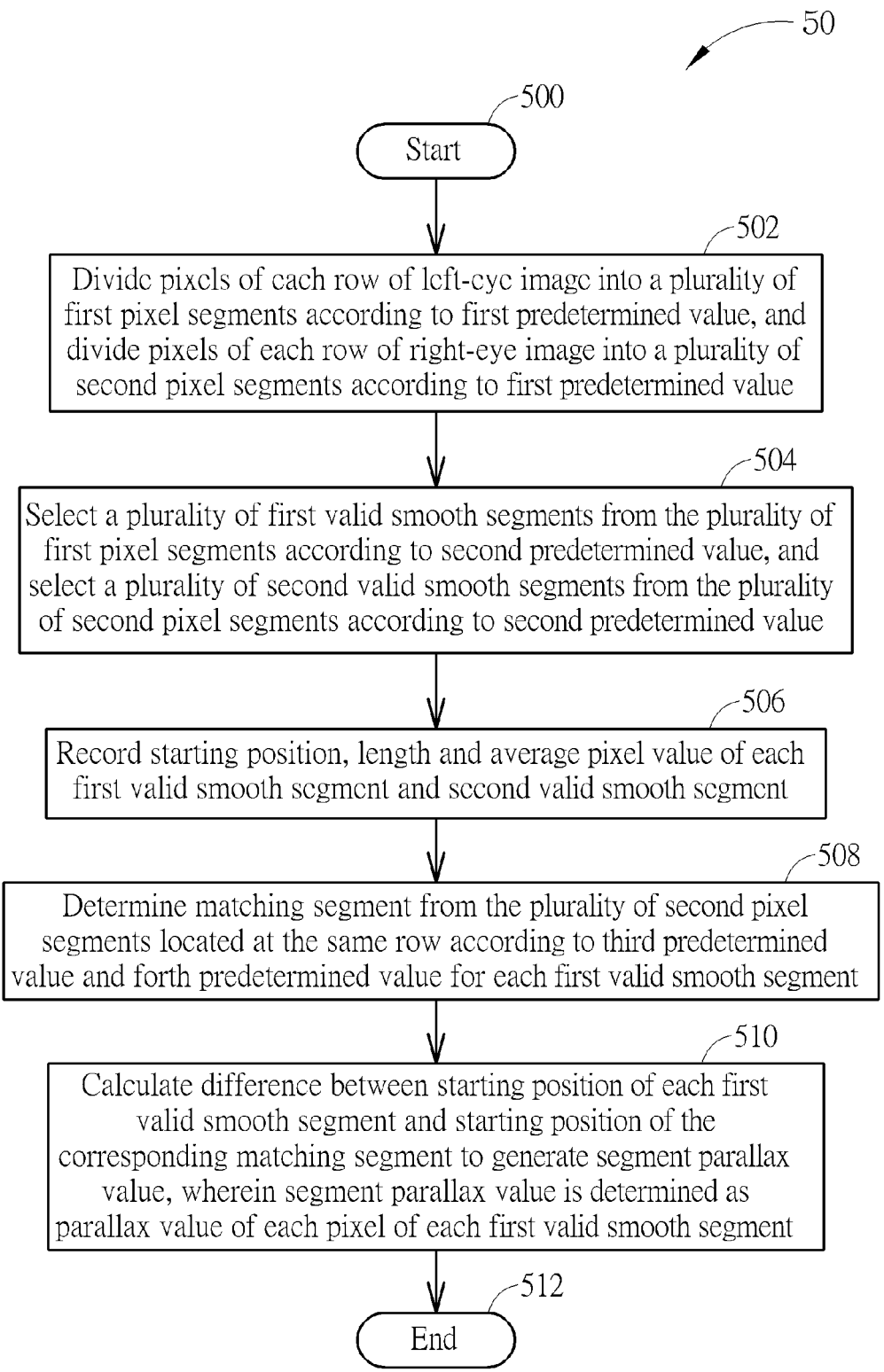
FIG. 5 is a schematic diagram of a procedure according to another exemplary embodiment of the present invention.

On the other hand, regarding parallax calculation, the parallax calculating unit 112 can use any existing way to calculate parallax values of pixels in the 3D image IMG. Moreover, the invention further provides a parallax calculation process for images. Please refer to FIG. 4, which is a schematic diagram of an alternative design of the parallax calculating unit 112 shown in FIG. 1 according to an exemplary embodiment of the present invention. As shown in FIG. 4, a parallax calculating unit 40 includes a dividing unit 402, a smooth segment generating unit 404, a recording unit 406, a match determining unit 408 and a calculating unit 410. One calculation operation of the parallax calculating unit 40 may be summarized in a procedure 50 as shown in FIG. 5. The procedure 50 includes, but is not limited to, the following steps:

Step 500: Start.

Step 502: Divide pixels of each row of left-eye image into a plurality of first pixel segments according to first predetermined value, and divides pixels of each row of right-eye image into a plurality of second pixel segments according to first predetermined value.

Step 504: Select a plurality of first valid smooth segments from the plurality of first pixel segments according to second predetermined value, and select a plurality of second valid smooth segments from the plurality of second pixel segments according to second predetermined value.

Step 506: Record starting position, length and average pixel value of each first valid smooth segment and second valid smooth segment.

Step 508: Determine matching segment from the plurality of second pixel segments located at the same row according to third predetermined value and forth predetermined value for each first valid smooth segment.

Step 510: Calculate difference between starting position of each first valid smooth segment and starting position of the corresponding matching segment to generate segment parallax value, wherein segment parallax value is determined as parallax value of each pixel of each first valid smooth segment.

Step 512: End.

According to the procedure 50, the parallax calculating unit 40 can calculate parallax values of pixels in the 3D image IMG based on smooth segments. Detailed description of the steps of the procedure 50 is as follows. In Step 502, pixels of each row in the horizontal direction of the left-eye image are divided into a plurality of first pixel segments according to a first predetermined value PV1 by the dividing unit 402. Moreover, pixels of each row in the horizontal direction of the right-eye image are divided into a plurality of second pixel segments according to the first predetermined value PV1 by the dividing unit 402. Preferably, for each first pixel segment, an absolute pixel difference between each pixel and each of its adjacent pixels is smaller than or equal to the first predetermined value PV1. For each second pixel segment, an absolute pixel difference between each pixel and each of its adjacent pixels is smaller than or equal to the first predetermined value PV1. In other words, for each row of the left-eye image, consecutive pixels with the absolute pixel difference between any two adjacent pixels being smaller than or equal to the first predetermined value PV1 can be arranged into a first pixel segment by the dividing unit 402. Similarly, for each row of the right-eye image, consecutive pixels with the absolute pixel difference between any two adjacent pixels being smaller than or equal to the first predetermined value PV1 can be arranged into a right-eye pixel segment by the dividing unit 402.

In Step 504, the smooth segment generating unit 404 selects a plurality of first valid smooth segments from the plurality of first pixel segments according to a second predetermined value PV2, and selects a plurality of second valid smooth segments from the plurality of second pixel segments according to the second predetermined value PV2. Preferably, length of each first valid smooth segment is greater than the second predetermined value PV2 and length of each second valid smooth segment is greater than the second predetermined value PV2. In other words, the first pixel segments with length being greater than the second predetermined value PV2 are selected as the first valid smooth segments and the second pixel segments with length being greater than the second predetermined value PV2 are selected as the second valid smooth segments.

Furthermore, in Step 506, the recording unit 406 records a starting position, a length and an average pixel value of each first valid smooth segment, and records a starting position, a length and an average pixel value of each second valid smooth segment. Besides, since each first valid smooth segment is selected from the plurality of first pixel segments, the absolute pixel difference between each pixel and each of its adjacent pixels will be smaller than or equal to the first predetermined value PV1 for each first pixel segment. This means, pixel values of pixels on the same first valid smooth segment are insignificantly different. Thus, the pixel value of some pixel on each first valid smooth segment can be regarded as the average pixel value of the corresponding first valid smooth segment. The pixel value of some pixel on each second valid smooth segment can also be regarded as the average pixel value of the corresponding second valid smooth segment.

In Step 508, the match determining unit 408 determines matching segments from the plurality of second valid smooth segments located at the same row according to a third predetermined value PV3 and a forth predetermined value PV4 for each first valid smooth segment. The match determining unit 408 compares the length and the average pixel value of the each first valid smooth pixel segment with the length and the average pixel value of each of the plurality of second valid smooth segments located at the same row. When an absolute difference between the length of a first valid smooth pixel segment and the length of a second valid smooth segment is smaller than the third predetermined value PV3 and an absolute difference between the average pixel value of the first valid smooth pixel segment and the average pixel value of the second valid smooth segment is smaller than the forth predetermined value PV4, the match determining unit 408 selects the second valid smooth segment as a matching segment of the first valid smooth pixel segment. For example, suppose five first valid smooth segments LL1 to LL5 are selected on the second row of the left-eye image IMG_L and eight second valid smooth segments RL1 to RL8 are selected on the second row of the right-eye image IMG_R. Furthermore, each of the first valid smooth segments LL1 to LL5 is compared with each of the second valid smooth segments RL1 to RL8. If an absolute difference between the length of the first valid smooth pixel segment LL2 and the length of the second valid smooth segment RL4 is smaller than the third predetermined value PV3 and an absolute difference between the average pixel value of the first valid smooth pixel segment LL2 and the average pixel value of the second valid smooth segment RL4 is smaller than the forth predetermined value PV4, it is determined that a successful match is achieved for the first valid smooth pixel segment LL2. As a result, the match determining unit 408 selects the second valid smooth segment RL4 as a matching segment of the first valid smooth pixel segment LL2. In addition, for a first valid smooth pixel segment, one or more matching segments may be selected. Otherwise, there is no corresponding matching segment selected for the first valid smooth pixel segment.

In Step 510, for each first valid smooth segment, the calculating unit 410 calculates a difference between the starting position of the first valid smooth segment and the starting position of the corresponding matching segment to generate a segment parallax value. The calculated segment parallax value may be determined as a parallax value of each pixel of the first valid smooth segment. For example, if the second valid smooth segment RL4 is a matching segment of the first valid smooth pixel segment LL2, a segment parallax value is generated by calculating a difference between the starting position of the first valid smooth segment LL2 and the starting position of the second valid smooth segment RL4 (the corresponding matching segment), and the calculated segment parallax value can be regarded as the parallax value of each pixel of the first valid smooth segment LL2. As a result, the parallax calculating unit 40 can calculate parallax values of pixels row by row in the 3D image IMG via the above-mentioned smooth segment based calculation, thus effectively reducing calculation complexity and operation time of parallax value calculation.

When there are multiple matching segments determined for a first valid smooth segment, i.e. the first valid smooth segment has multiple matching segments. The calculating unit 410 further calculates differences between the starting position of the first valid smooth segment and the starting positions of the multiple matching segments to generate a plurality of segment parallax values. One segment parallax value with the smallest absolute value among the plurality of segment parallax values can be selected by the calculating unit 410 selects for acting as the matching segment of the first valid smooth segment. For example, if the first valid smooth segment LL2 has three corresponding matching segments, such as the second valid smooth segments RL4 to RL6. In such a situation, the calculating unit 410 can calculate difference between the starting position of the first valid smooth segment LL2 and the starting position of each of the selected second valid smooth segments RL4 to RL6 (the corresponding matching segments), so as to obtain three segment parallax values. Thus, one segment parallax value with the smallest absolute value among these three segment parallax values is selected for acting as the matching segment of the first valid smooth segment LL2. In other words, the selected segment parallax value may be determined as a parallax value of each pixel of the first valid smooth segment LL2. Besides, after a plurality of segment parallax values are determined, the calculating unit 410 can further perform a filtering process on the plurality of determined matching segments. Then, the calculating unit 410 compares the plurality of filtered matching segments. Or, after a plurality of segment parallax values are determined, the segment parallax values with the largest absolute value or the smallest absolute value can be discarded. The calculating unit 410 further compares the remaining segment parallax values for the matching segment, thus providing more accurately calculation.

Besides, regarding a first pixel segment not being selected as a first valid smooth segment or without any corresponding matching segment in the left-eye image IMG_L, the calculating unit 410 performs an interpolation operation on its adjacent first pixel segment having the matching segment to generate an interpolation result. The interpolation result is determined as the parallax value of each pixel of the first pixel segment not being selected as the first valid smooth segment or without any corresponding matching segment. Thus, the parallax values of all pixels on each row of the left-eye image IMG_L are calculated accordingly. For example, please further refer to FIG. 3. a frame line L represent a row of the 3D image IMG. As shown in FIG. 3, mountainside located at left side, hands of the object OL1 (OR1), the belly of the object OL1 (OR1), mountain, cloth of the object OL2 (OR2), and mountainside located at right side can be calculated as valid smooth segments in the left-eye image IMG_L and the right-eye image IMG_R. However, the length of a line LL representing across the mountain in the left-eye image IMG_L is different from the length of a line RR representing across the mountain in the right-eye image IMG_R. Therefore, the parallax value of each pixel on the line LL can be obtained by performing interpolation operations on its adjacent first pixel segment having the matching segment.

In summary, the image depth adjustment apparatus of the invention is capable of moving each pixel of the 3D image for adjusting the depth according to the corresponding parallax modification values such that the relative distances among objects in the 3D image will be changed. As a result, the observer can obviously perceive the increasing or reducing 3D effect. Moreover, while utilizing different size of displays to view the 3D image, the user can adjust the layer of 3D effect via the image depth adjustment apparatus of the invention according to different requirements, and thus enhancing convenience and providing a comfortable view for the observer. Besides, the invention further provides a parallax calculation process for images, thereby effectively reducing computation complexity and operation time for 3D images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting image depth, comprising:
   receiving a three-dimension (3D) image, wherein the 3D image comprises a first image and a second image;
   measuring the 3D image to generate a first parallax gradient value;
   calculating a second parallax gradient value according to the first parallax gradient value and a user setting value, comprising calculating a product of the first parallax gradient value and the user setting value to obtain the second parallax gradient value;
   calculating a parallax modification value according to the second parallax gradient value; and
   moving the first image according to the corresponding parallax modification value so as to generate an adjusted first image for replacing the first image.

2. The method of claim 1, wherein the step of measuring the 3D image to generate the first parallax gradient value comprises:
   measuring the first image and the second image of the 3D image and calculating parallax values of pixels in the 3D image; and
   calculating the first parallax gradient value according to the parallax values of all pixels or part of pixels in the 3D image.

3. The method of claim 2, wherein the step of calculating the parallax values of pixels in the 3D image comprises:
   dividing pixels of each row of the first image into a plurality of first pixel segments according to a first predetermined value, and dividing pixels of each row of the second image into a plurality of second pixel segments according to the first predetermined value;
   selecting a plurality of first valid smooth segments from the plurality of first pixel segments according to a second predetermined value, and selecting a plurality of second valid smooth segments from the plurality of second pixel segments according to the second predetermined value;
   recording a starting position, a length and an average pixel value of each first valid smooth segment, and recording a starting position, a length and an average pixel value of each second valid smooth segment;
   determining a matching segment from the plurality of second pixel segments located at the same row according to a third predetermined value and a forth predetermined value for each first valid smooth segment; and
   calculating a difference between the starting position of each first valid smooth segment and the starting position of the corresponding matching segment to generate a segment parallax value, wherein the segment parallax value is determined as a parallax value of each pixel of the each first valid smooth segment.

4. The method of claim 3, wherein for each first pixel segment, an absolute pixel difference between each pixel and each of its adjacent pixels is smaller than or equal to the first predetermined value, and for each second pixel segment, an absolute pixel difference between each pixel and each of its adjacent pixels is smaller than or equal to the first predetermined value.

5. The method of claim 3, wherein the length of each first valid smooth segment is greater than the second predetermined value and the length of each second valid smooth segment is greater than the second predetermined value.

6. The method of claim 3, wherein the step of determining the matching segment from the plurality of second pixel segments located at the same row according to the third predetermined value and the forth predetermined value for the each first valid smooth segment comprises:
   comparing the length and the average pixel value of the each first valid smooth segment with the length and the average pixel value of each of the plurality of second valid smooth segments located at the same row; and
   when an absolute difference between the length of the each first valid smooth segment and the length of a second valid smooth segment of the plurality of second valid smooth segments is smaller than the third predetermined value and an absolute difference between the average pixel value of the each first valid smooth segment and the average pixel value of the second valid smooth segment is smaller than the forth predetermined value, selecting the second valid smooth segment as the matching segment of the each first valid smooth segment.

7. The method of claim 6, wherein the step of calculating the difference between the starting position of the first valid smooth segment and the starting position of the corresponding matching segment to generate the segment parallax value wherein the segment parallax value is determined as the parallax value of each pixel of the each first valid smooth segment comprises:
   when the each first valid smooth segment has a plurality of matching segments, calculating differences between the starting position of the each first valid smooth segment and the starting positions of the plurality of matching segments to generate a plurality of segment parallax values; and
   selecting a segment parallax value having the smallest absolute value from the plurality of segment parallax values for acting as the matching segment of the each first valid smooth segment.

8. The method of claim 3, further comprising:
   for a first pixel segment not being selected as a first valid smooth segment, performing an interpolation operation on its adjacent first pixel segment having the matching segment to generate a first interpolation result, wherein the first interpolation result is determined as the parallax value of each pixel of the first pixel segment not being selected as the first valid smooth segment; and
   for a first valid smooth segment without a corresponding matching segment, performing an interpolation operation on its adjacent first pixel segment having the matching segment to generate a second interpolation result, wherein the second interpolation result is determined as the parallax value of each pixel of the first pixel segment without the matching segment.

9. The method of claim 2, wherein the first parallax gradient value comprises a first horizontal parallax gradient value and a first vertical parallax gradient value and the step of calculating the first parallax gradient value according to the parallax values of all pixels or part of pixels in the 3D image comprises:
   calculating a difference between an average of the parallax values of the left-half of the 3D image and an average of the parallax values of the right-half of the 3D image, so as to obtain the first horizontal parallax gradient value; and
   calculating a difference between an average of the parallax values of the upper-half of the 3D image and an average of the parallax value of the bottom-half of the 3D image, so as to obtain the first vertical parallax gradient value.

10. The method of claim 2, wherein the first parallax gradient value comprises a first horizontal parallax gradient value and a first vertical parallax gradient value and the step of calculating the first parallax gradient value according to the parallax values comprises:
   dividing the 3D image into a plurality of blocks along the horizontal direction;
   calculating an average of the parallax values of each block along the horizontal direction;
   respectively calculating a difference of parallax between each adjacent blocks so as to generate a plurality of first candidate horizontal parallax gradient values;
   calculating an average of the plurality of first candidate horizontal parallax gradient values to obtain the first horizontal parallax gradient value;
   dividing the 3D image into a plurality of blocks along the vertical direction and calculating an average of the parallax values of each block along the vertical direction;
   respectively calculating a difference of parallax between each adjacent blocks so as to generate a plurality of first candidate vertical parallax gradient values; and
   calculating an average of the plurality of first candidate vertical parallax gradient values to obtain the first vertical parallax gradient value.

11. The method of claim 1, wherein the second parallax gradient value comprises a second horizontal parallax gradient value and a second vertical parallax gradient value, the parallax modification value comprises a horizontal parallax modification value and a vertical parallax modification, and the step of calculating the parallax modification value according to the second parallax gradient value comprises:
   for a plurality of pixels, calculating a horizontal difference between a horizontal coordinate value of a corresponding pixel and a coordinate value of horizontal zero-point, and calculating a product of the horizontal difference and the second horizontal parallax gradient value to obtain the horizontal parallax modification value of the corresponding pixel; and
   calculating a vertical difference between a vertical coordinate value of the corresponding pixel and a coordinate value of vertical zero-point, and calculating a product of the vertical difference and the second vertical parallax gradient value to obtain the vertical parallax modification value of the corresponding pixel.

12. An image depth adjustment apparatus, comprising:
   a receiving unit for receiving a three-dimension (3D) image, wherein the 3D image comprises a first image and a second image;
   a first parallax gradient generating unit for measuring the 3D image to generate a first parallax gradient value;
   a second parallax gradient generating unit for calculating a second parallax gradient value according to the first parallax gradient value and a user setting value;
   a modification value generating unit for calculating a parallax modification value according to the second parallax gradient value, wherein the modification value generating unit calculates a product of the first parallax gradient value and the user setting value to obtain the second parallax gradient value; and
   an adjusting unit for moving the first image according to the corresponding parallax modification value so as to generate an adjusted first image for replacing the first image.

13. The image depth adjustment apparatus of claim 12, wherein the first parallax gradient generating unit comprises:
   a parallax calculating unit measuring the first image and the second image of the 3D image and calculating parallax values of pixels in the 3D image; and
   a gradient calculating unit for calculating the first parallax gradient value according to the parallax values of all pixels or part of pixels in the 3D image.

14. The image depth adjustment apparatus of claim 13, wherein the parallax calculating unit comprises:
   a dividing unit for dividing pixels of each row of the first image into a plurality of first pixel segments according to a first predetermined value, and dividing pixels of each row of the second image into a plurality of second pixel segments according to the first predetermined value;

a smooth segment generating unit for selecting a plurality of first valid smooth segments from the plurality of first pixel segments according to a second predetermined value, and selecting a plurality of second valid smooth segments from the plurality of second pixel segments according to the second predetermined value;

a recording unit for recording a starting position, a length and an average pixel value of each first valid smooth segment, and recording a starting position, a length and an average pixel value of each second valid smooth segment;

a match determining unit for determining a matching segment from the plurality of second pixel segments located at the same row according to a third predetermined value and a forth predetermined value for each first valid smooth segment; and a calculating unit for calculating a difference between the starting position of each first valid smooth segment and the starting position of the corresponding matching segment to generate a segment parallax value, wherein the segment parallax value is determined as a parallax value of each pixel of the each first valid smooth segment.

15. The image depth adjustment apparatus of claim 14, wherein the match determining unit compares the length and the average pixel value of the each first valid smooth segment with the length and the average pixel value of each of the plurality of second valid smooth segments located at the same row, and when an absolute difference between the length of the each first valid smooth segment and the length of a second valid smooth segment of the plurality of second valid smooth segments is smaller than the third predetermined value and an absolute difference between the average pixel value of the each first valid smooth segment and the average pixel value of the second valid smooth segment is smaller than the forth predetermined value, the match determining unit selects the second valid smooth segment as the matching segment of the each first valid smooth segment.

16. The image depth adjustment apparatus of claim 15, wherein when the each first valid smooth segment has a plurality of matching segments, the calculating unit calculates differences between the starting position of the each first valid smooth segment and the starting positions of the plurality of matching segments to generate a plurality of segment parallax values, and the calculating unit selects a segment parallax value having the smallest absolute value from the plurality of segment parallax values for acting as the matching segment of the each first valid smooth segment.

17. The image depth adjustment apparatus of claim 14, wherein for a first pixel segment not being selected as a first valid smooth segment, the calculating unit performs an interpolation operation on its adjacent first pixel segment having the matching segment to generate a first interpolation result and the first interpolation result is determined as the parallax value of each pixel of the first pixel segment not being selected as the first valid smooth segment, and for a first valid smooth segment without a corresponding matching segment, the calculating unit performs an interpolation operation on its adjacent first pixel segment having the matching segment to generate a second interpolation result and the second interpolation result is determined as the parallax value of each pixel of the first pixel segment without the matching segment.

18. The image depth adjustment apparatus of claim 13, wherein the first parallax gradient value comprises a first horizontal parallax gradient value and a first vertical parallax gradient value and the gradient calculating unit calculates a difference between an average of the parallax values of the left-half of the 3D image and an average of the parallax values of the right-half of the 3D image so as to obtain the first horizontal parallax gradient value, and the gradient calculating unit calculates a difference between an average of the parallax values of the upper-half of the 3D image and an average of the parallax value of the bottom-half of the 3D image so as to obtain the first vertical parallax gradient value.

19. The image depth adjustment apparatus of claim 13, wherein the first parallax gradient value comprises a first horizontal parallax gradient value and a first vertical parallax gradient value, the gradient calculating unit divides the 3D image into a plurality of blocks along the horizontal direction and calculates an average of the parallax values of each block along the horizontal direction, the gradient calculating unit respectively calculates a difference of parallax between each adjacent blocks so as to generate a plurality of first candidate horizontal parallax gradient values and calculates an average of the plurality of first candidate horizontal parallax gradient values to obtain the first horizontal parallax gradient value, and the gradient calculating unit divides the 3D image into a plurality of blocks along the vertical direction and calculates an average of the parallax values of each block along the vertical direction, the gradient calculating unit respectively calculates a difference of parallax between each adjacent blocks so as to generate a plurality of first candidate vertical parallax gradient values and calculates an average of the plurality of first candidate vertical parallax gradient values to obtain the first vertical parallax gradient value.

20. The image depth adjustment apparatus of claim 12, wherein the second parallax gradient value comprises a second horizontal parallax gradient value and a second vertical parallax gradient value, the parallax modification value comprises a horizontal parallax modification value and a vertical parallax modification, the second parallax gradient generating unit calculates a horizontal difference between a horizontal coordinate value of a corresponding pixel and a coordinate value of horizontal zero-point, and calculates a product of the horizontal difference and the second horizontal parallax gradient value to obtain the horizontal parallax modification value of the corresponding pixel, the second parallax gradient generating unit calculates a vertical difference between a vertical coordinate value of the corresponding pixel and a coordinate value of vertical zero-point, and calculating a product of the vertical difference and the second vertical parallax gradient value to obtain the vertical parallax modification value of the corresponding pixel.

* * * * *

UNITED STATES PATENT AND TRADEMARK OFFICE
CERTIFICATE OF CORRECTION

PATENT NO. : 9,082,210 B2
APPLICATION NO. : 13/802859
DATED : July 14, 2015
INVENTOR(S) : Yue-Yong Chen It is certified that error appears in the above-identified patent and that said Letters Patent is hereby corrected as shown below:

On the title page, item (72), correct the residence of the inventor from "Gunagdong" to --Guangdong--.

Signed and Sealed this
Eighth Day of December, 2015

Michelle K. Lee
*Director of the United States Patent and Trademark Office*